Nov. 14, 1967
A. J. AUSTIN ET AL
3,352,779
HEMODIALYSIS SYSTEM
Filed Oct. 23, 1965
6 Sheets-Sheet 3
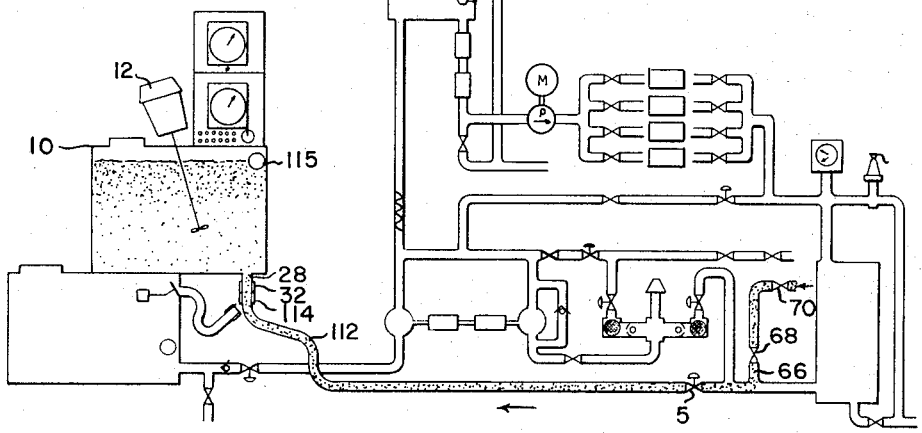
FIG__3
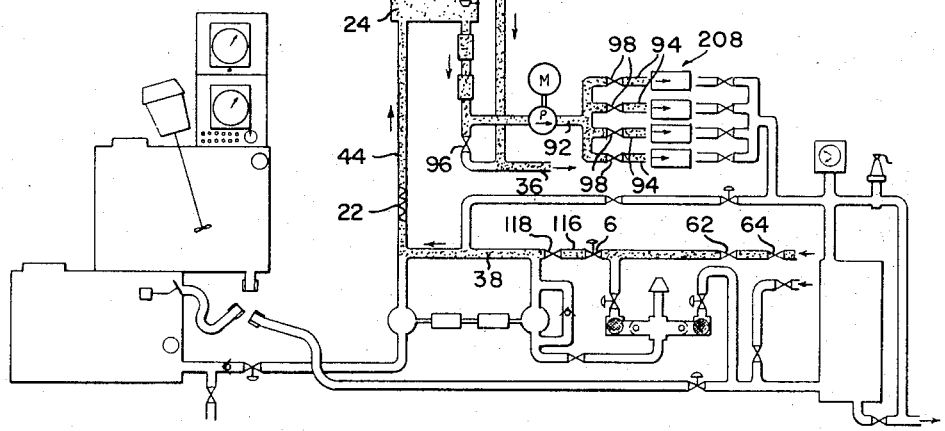
FIG__4
AVERY J. AUSTIN
ROBERT S. PATCH
*INVENTORS*
BY *Seed & Berry*
*ATTORNEYS*

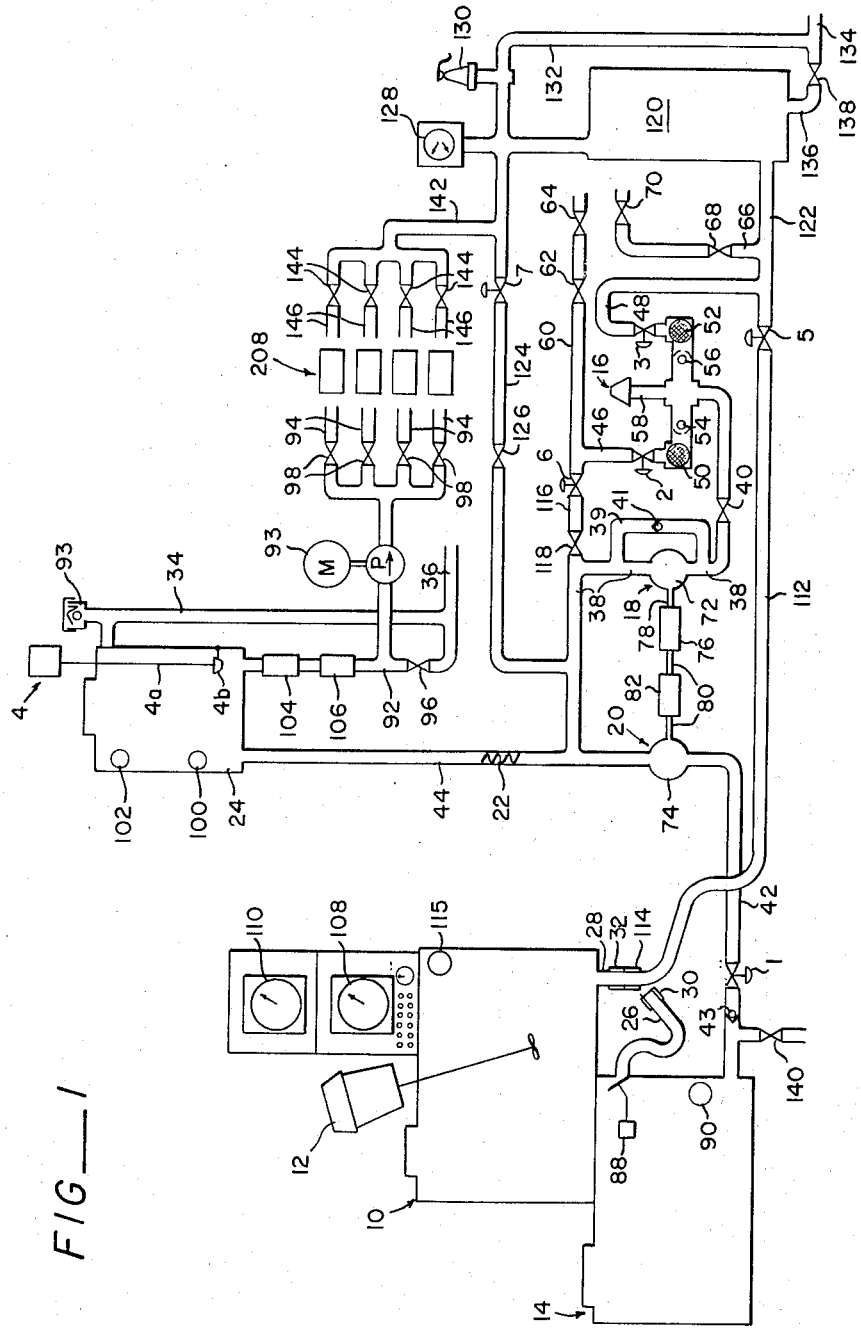

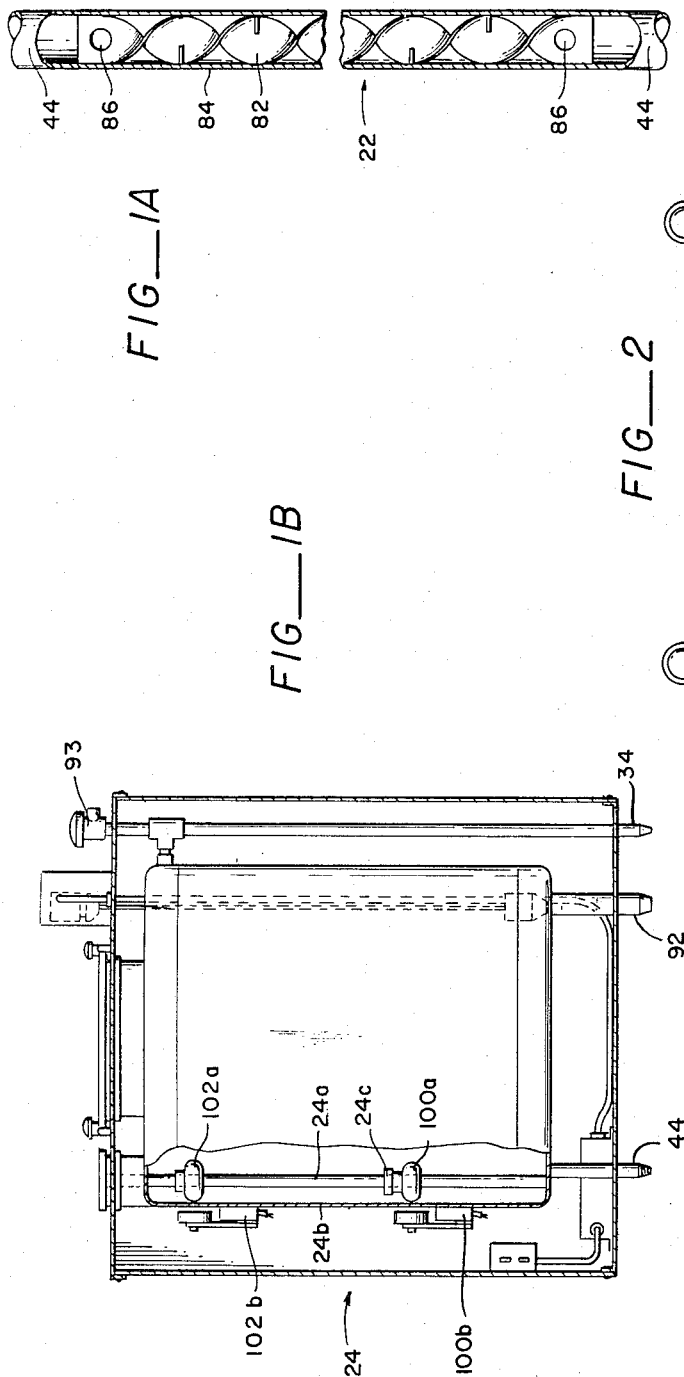

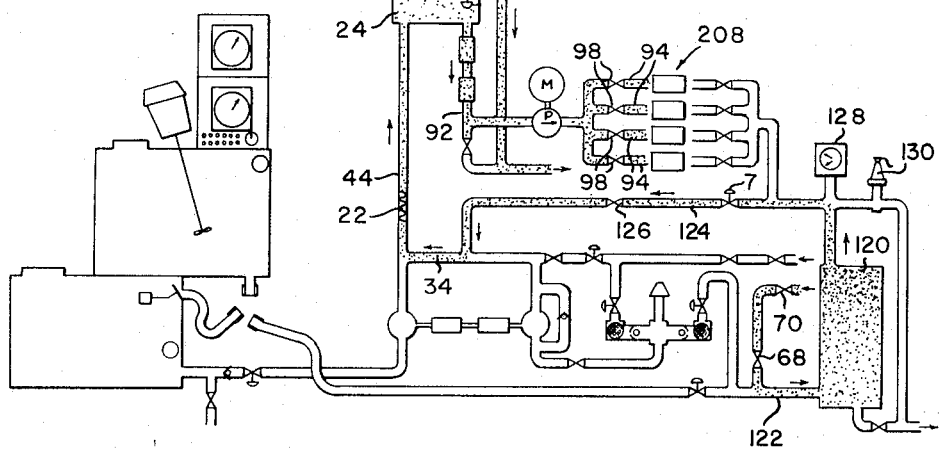
FIG_5
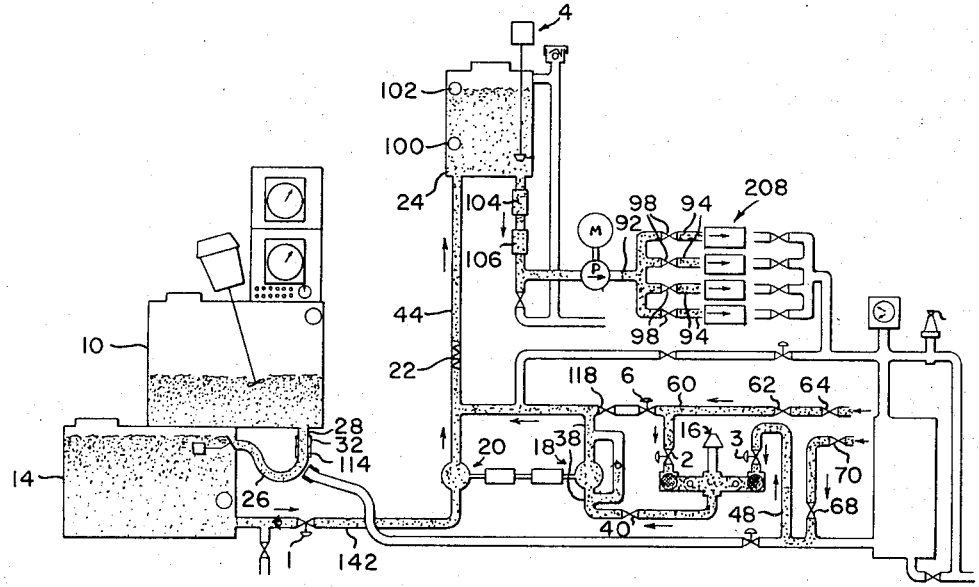
FIG_6

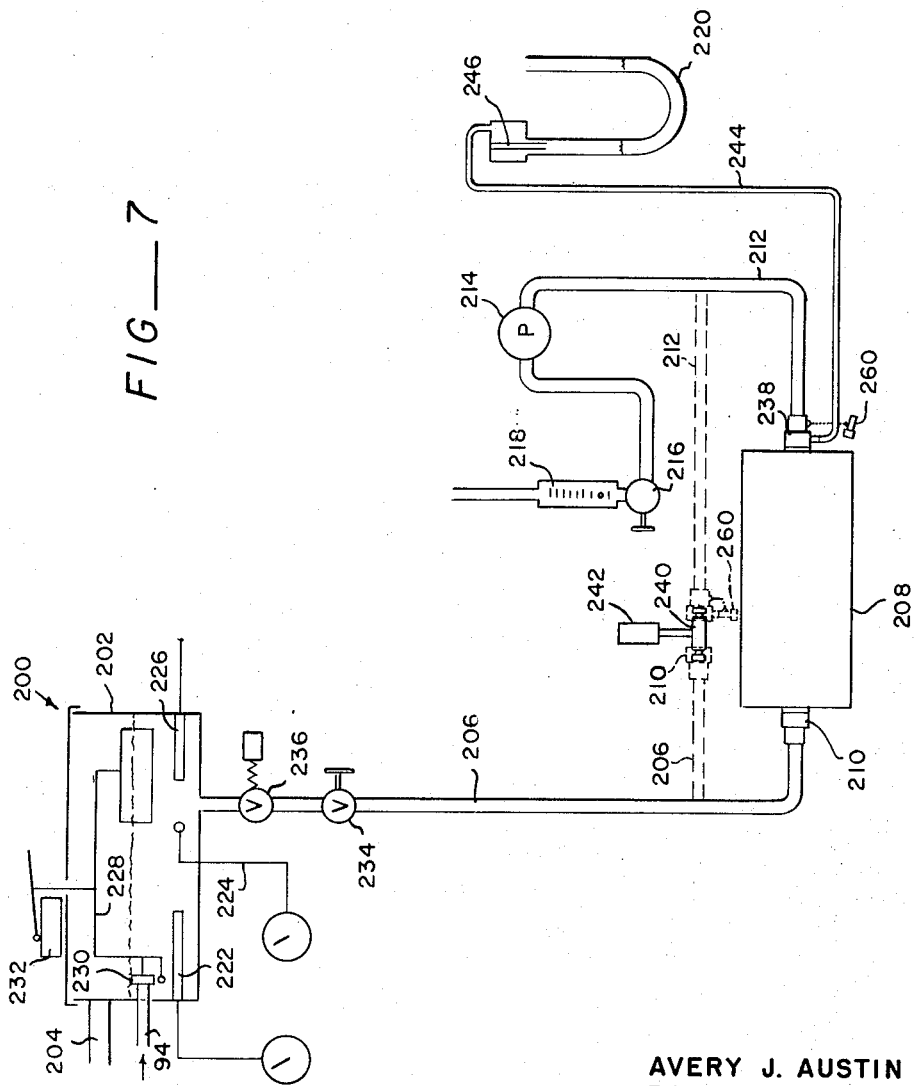

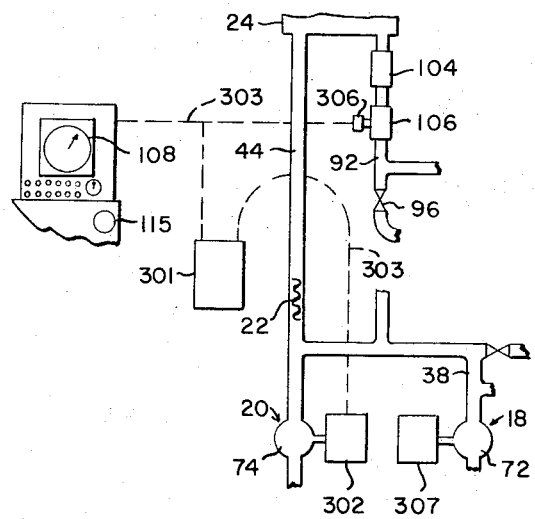
FIG__8A
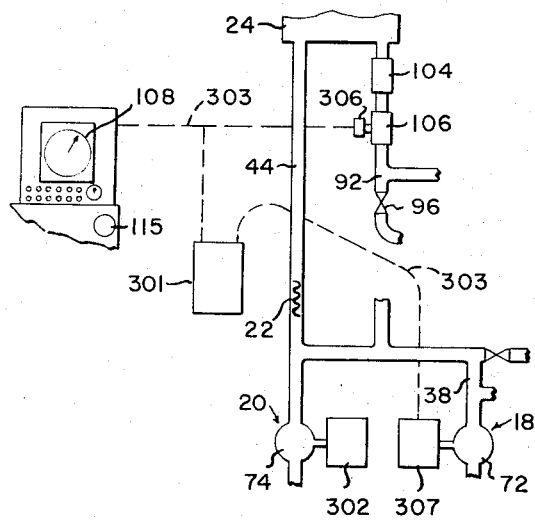
FIG__8B

3,352,779
HEMODIALYSIS SYSTEM
Avery J. Austin, Seattle, and Robert S. Patch, Bainbridge Island, Wash., assignors to Sweden Freezer Manufacturing Co., Seattle, Wash., a corporation of Washington
Filed Oct. 23, 1965, Ser. No. 503,003
23 Claims. (Cl. 210—23)

This invention is a hemodialysis system and relates to the medico-engineering arts concerned with artificial kidney systems.

In recent years, artificial kidneys have been developed to treat patients with acute renal failure and to rehabilitate patients who would otherwise die of chronic uremia. One of the major problems in the use of artificial kidneys has been the complexity of the technique of hemodialysis. Apparatus associated with this technique heretofore could be operated and controlled only by highly trained personnel. Furthermore, such apparatus is quite bulky and very expensive and thus has found only limited use despite the pressing need for artificial kidneys. Such apparatus also requires special precautions to avoid excessive growth of bacteria and must be sterilized by a complicated process after each dialysis to prevent bacteria from being carried over to the next dialysis. Such apparatus also requires cooling a portion of a patient's blood to minimize bacteria growth and then rewarming the blood portion prior to its infusion into the patient.

A primary object of this invention is to provide a hemodialysis system that can be operated and controlled safely by existing hospital personnel. Another object is to provide a central hemodialysis system which can supply dialysis solution to several compact bedside artificial kidneys simultaneously.

A further object is to provide a ready-to-use supply of dialysis solution without wasting any of such supply. A still further object is to provide such a central system wherein each bedside unit can be controlled independently of other bedside units. Still another object is to provide such a system wherein harmful bacteriological growth is greatly inhibited or even eliminated. A still further object is to provide such a system wherein manufacture of dialysis solution does not require shut down of the system and does not consume an inordinate amount of time. Another object is to provide such a system wherein the temperature and concentration of the dialysis solution is automatically and continuously monitored. A further object is to provide such a system which can be safely and conveniently sterilized. Still another object is to provide such a system wherein a portion of the patient's blood need not be cooled to minimize bacteria growth. A still further object is to provide such a system wherein the dialysis solution is discarded after a single use thereby greatly minimizing contamination problems, and increasing dialysis efficiency.

These and other objects and advantages of this invention will be apparent from the following description and the accompanying drawings, of which:

FIG. 1 is a schematic diagram of the system of this invention;

FIG. 1a is an elevation view in cross-section of one of the components of the system;

FIG. 1b is an elevation view of the surge tank of the system;

FIG. 2 is an elevation view of a control panel for use with the system;

FIGS. 3–6 are schematic flow diagrams of the system during various operating conditions;

FIG. 7 is a schematic diagram of another section of the system; and

FIGS. 8a and 8b are schematic diagrams of a modified section of the system shown in FIG. 1.

The dialysis system of this invention comprises an automatic, self-contained system for manufacturing concentrated dialysate from an acceptable water supply and automatically producing a dialysis solution therefrom for distribution to one or more dialyzers at bedside stations. Three central storage means are provided, one for preparing and mixing dialysate concentrate, one for holding a supply of dialysate concentrate, and one for holding a ready-to-use supply of dialysis solution. Means are provided to transfer dialysate concentrate from the mixing means to the supply means. Means are also provided to mix dialysate concentrate from the supply means with controlled temperature water at a predetermined ratio to form the dialysis solution. Means are provided to interconnect the mixing means to the supply means and to connect the mixing means with a water supply in a manner such that accidental dilution of the dialysate concentrate is prevented. Means are also provided to automatically sterilize the system including the bedside stations, dialysis solution lines and dialysis solution storage means only when the bedside stations are disconnected from the dialyzers. Means are provided to control in-put water temperature and dialysis solution concentration. Means may also be provided for sterilizing individual bedside stations without interfering with the use of other bedside stations for dialysis. Several solenoid-operated control valve means are provided to permit automatic operation of the system.

More particularly two central tanks are provided in the central pumping unit, one for preparing and mixing the dialysate concentrate, and one for holding a supply of dialysate concentrate. A third tank serves as a surge tank for the proportioned, ready-to-use dialysis solution. All tanks are fabricated of stainless steel and provided with adequate access for cleaning and sanitizing. The mixing tank and supply tank are interconnected with a manual quick disconnect shut-off type valve to prevent accidental dilution of concentrate. A mix motor and paddle shaft are mounted on the dialysate concentrate mix tank. Freshly mixed concentrate may be prepared and automatically added to the supply tank at any time without waiting for the supply tank to empty. The mixing tank is provided with an automatic batch level water filling control. The supply tank is provided with a low level audible alarm and an electrical contact for activating a remote signal at a level that will provide several hours of supply time at maximum dialysate concentrate rate of withdrawal to permit replenishing the dialysate concentrate supply.

A proportioning pumping system mixes dialysate concentrate with tap water in an infinitely adjustable ratio that will hold to an accurate setting and that will deliver this mixture to the surge tank. Tap water will enter the system through a temperature controlling automatic mixing valve which may be pre-set to desired temperature. High and low volume switches in the surge tank will control operation of the pumping system to maintain liquid level within working range in the surge tank automatically, according to demand by the bedside stations being served at any given time.

Safety is the key design consideration in this hemodialysis system. A series of audible and visual alarms and automatic shut-down controls protect in the following ways:

(1) Ionic concentration of dialysate delivered from the surge tank is accurately monitored by two precision conductivity meters within predetermined limits. Changes beyond these limits activate audible and visual alarms and automatically interrupt dialysis solution flow to the bedside station. A dual pen oscillograph can be used to continuously record dialysis solution conductivity and temperature on a strip chart. Direct reading dials indicate conductivity continuously.

(2) Master controls are so interlocked as to prevent starting of sterilization of the system if dialysis is still going on. It is not possible to accidentally deliver water at sterilizing temperature to a dialyzer in the circuit.

(3) Low level alarms in the dialysate concentrate at maximum utilization rate remains to allow ample time for replenishment.

Automatic sterilization of the system including surge tanks, dialysate lines and bedside station circuits is provided with bedside stations interlocked to prevent initiating sterilization cycle until dialyzers are removed from the circuit. Sterilization is accomplished with hot water (about 190° F.) from a 140° minimum temperature input water supply.

Equipment may be provided with a connection and by-pass controls so that a separate sterilizing water line may be installed parallel to the dialysis solution line as it is run into the patient treatment area. Individual bedside stations can then be simply disconnected from the solution line and connected to the sterilizing line, and then sterilized on an individual bed basis. This will not disturb or interfere with the use of other stations in operation on the central pumping equipment system.

A third supply line may be brought into the patient treatment areas and parallel to the other lines, which is connected to a secondary dialysis supply and central pumping equipment system. This would be operated with a solution that contains a standard potassium inclusion. It is expected that a good percentage of patients who cannot be maintained on a standard dialysis solution can be put onto the standard potassium loaded solution for alternate treatments or for a portion of each treatment, by simply connecting the station to that supply line.

In addition to the many safety factors in the supply system itself, the system when used with the preferred bedside station of FIG. 7 provides additional safety features.

(1) Dialysis solution temperature is monitored and indicated at each bedside station after final tempering. Temperature greater than 106° F. trips visual alarm and automatically interrupts dialysis solution flow to the bedside station.

(2) Negative pressure at dialyzer is monitored and interruption of dialysis solution flow due to a blocked or pinched line automatically shuts off the bedside station.

(3) A low float switch shuts the bedside pumping system off if its head chamber should run dry of dialysis solution.

The bedside station is designed to be used with a Kiil-type dialyzer. The bedside station will deliver the dialysis solution to the Kiil-dialyzer with a manually adjustable pressure range of from atmosphere to 150 millimeters negative pressure across the dialyzer. When adjusted, the station will control the setting with ±1 millimeter. The control automatically shuts off the negative pressure pumping and the solution flow if: the solution supply is interrupted, the negative pressure exceeds 150 millimeters, or the solution temperature exceeds 106° F. A corresponding alarm may be connected to the central alarm system or a station alarm monitor. When the cause of the interruption is corrected, the reset button can be actuated to restart the dialyze cycle.

The bedside station includes a dialysis solution reservoir tank vented to atmosphere (maximum pressure delivered to the dialyzer is static head pressure). Negative pressure is monitored by a mercury manometer graduated in millimeters and regulated by a manual valve. Dialysate flow is indicated by a flow meter and dialysate temperature is indicated by a thermometer. Automatic tempering of dialysis solution is provided with a range of adjustability controlled by a dial selector allowing adjustment of dialysate temperatures to the individual patient's comfort.

The system of this invention has a dialyzing cycle, a filling cycle, and a rinse and sterilizing cycle. With reference to FIG. 1, the components of these cycles are as follows:

The primary components of the dialyzing cycle portion of the system comprise means for mixing a dialysate concentrate comprising a mixing tank 10 and a motor-driven mixer 12, supply means for holding such dialysate concentrate comprising a supply tank 14, mixing valve means 16 for supplying water at a controlled temperature, water metering means 18, dialysate concentrate metering means 20, means 22 for mixing the metered dialysate concentrate with the metered controlled temperature water to produce a dialysis solution, and storage means comprising a surge tank 24 for holding a supply of dialysis solution to be drawn by bedside stations. A dialysate control valve means 1 controls dialysate concentrate flow from supply tank 14 to dialysate concentrate metering means 20, a cold water control valve means 2 controls cold water flow to mixing valve means 16 and a hot water control valve means 3 controls hot water flow to mixing valve means 16. A surge tank control valve means 4 controls dialysis solution flow from tank 24 to the bedside stations. A dialysate concentrate transfer means 26 connected to supply tank 14 and a transfer means 28 connected to mixing tank 10 have compatible quick disconnect couplers 30 and 32, respectively, which may be coupled for transfer of dialysate concentrate from mixing tank 10 to supply tank 14. Surge tank 24 is provided with an overflow conduit 34 connecting the upper portion of surge tank 24 to a drain conduit 36. A conduit 38 connects mixing valve means 16 to water metering means 18 and water metering means to dialysis solution mixing means 22. A pressure reducing valve 40 is placed in conduit 38 between mixing valve means 16 and water metering means 18. A bypass conduit 39 containing a check valve 41 connects to conduit 38 to bypass water metering means. Conduit 42, in which dialysate control valve means 1 is placed, connects supply tank 14 to dialysate concentrate metering means 20 and dialysate concentrate metering means 20 to dialysis solution mixing means 22. A check valve 43 is placed in conduit 42 to insure that dialysis solution cannot drain through metering means 20 into supply tank 14 when operation of the metering means is terminated. Conduit 44 connects dialysis solution mixing means 22 to surge tank 24.

Mixing valve means 16 preferably comprises a manually adjustable proportioning valve having a cold water inlet connected to a conduit 46 containing cold water control valve means 2, a hot water inlet connected to a conduit 48 containing hot water control valve means 3, a controlled temperature water outlet connected to conduit 38, wire mesh strainers 50 and 52 positioned in each inlet, cold and hot water check valves 54 and 56, and a manually operable proportioning control stem 58. Cold water is supplied to the mixing valve means inlet conduit 46 through a conduit 60 containing a pressure reducing valve 62 and a manually operable inlet valve 64. Hot water is supplied to the mixing valve means inlet conduit 48 through a conduit 66 containing a pressure reducing valve 68 and a manually-operable inlet valve 70.

Water and dialysate concentrate metering means 18 and 20 preferably comprise gear type biological metering pumps 72 and 74, respectively, driven by a motor 76 through shafts 78 and 80. A variable speed transmission assembly 82 is placed in shaft 80 to control the speed of dialysate pump 74 and thereby control the relative proportions of dialysate concentrate and water in the dialysis solution. Water metering means 18 preferably comprises two pumps 72 (one being shown) driven by motor 76.

Dialysis solution mixing means 22 comprises an elongated helical diffuser 82 as shown in detail view FIG. 1a. This helical diffuser 82 is formed from an elongated rectangular strip having a width corresponding approximately to the inner diameter of its casing 84 (casing 84 may be a section of conduit means 44). The rectangular strip is fabricated, by being twisted for example, into the helical shape shown to insure complete diffusion of the dialysate concentrate into the water as the two fluids pass helically along the flow path defined by the surface of helical diffuser 82. Both ends of helical diffuser 82 are provided with apertures 86 to aid in removal.

Supply tank 14 is provided with a float-type inlet control valve 88 which controls dialysate concentrate transfer from mixing tank 10 to supply tank 14 to prevent overfilling supply tank 14. The walls of supply tank 14 may be thermally insulated, if desired, to maintain the temperature of dialysate concentrate therein. A low level alarm device 90 is also provided in supply tank 14 to signal when the quantity of dialysate concentrate within supply tank 14 is reduced to the point of requiring replenishment. Supply tank 14 is also provided with a manually operable drain valve 140.

Surge tank 24 is provided with an outlet conduit 92 which is manifold to one or more bedside station supply conduits 94 and also connects to drain conduit 36 through manually operable shutoff valve 96. Motor-driven pump means 93 may be provided in conduit means 92 to insure adequate delivery of dialysis solution to the bedside stations. The walls of surge tank 24 are preferably thermally insulated to maintain the temperature of the dialysis solution therein. Dialysis solution flow through outlet conduit 92 is controlled by control valve means 4 which has a valve stem 4a extending through surge tank 24 with a plug 4b at the end thereto adapted to seat in the opening to outlet conduit means 92. A pressure relief valve 93 is provided in communication with the upper portion of surge tank 24 through overflow conduit 34. Each bedside station supply conduit 94 is provided with a manually operable shut-off valve 98.

Surge tank 24 is also provided with low and high level indicators 100 and 102 which are activated, respectively, when the dialysis solution level in surge tank 24 drops below a predetermined level or rises above a predetermined level. As shown in FIG. 1b, these level indicators comprise floats 100a and 102a slidably mounted on a vertical float rod 24a adjacent to the inner surface side wall 24 of the surge tank, and corresponding magnetic float-actuated microswitches 100b and 102b mounted adjacent the outer surface of said wall 24b in proximity to the floats. The floats are fabricated in the form of hollow annuli which are carried along the float rod by a rising or falling dialysis solution liquid level within the surge tank. A bumper member 24c is positioned on the float rod such that the lower float 100a cannot be carried upward past its switch 100b. Each switch is actuated when its respective float rises adjacent the switch magnet 100c or 102c. Because of the hollow annular shape of the low level float, it will remain buoyant as the dialysis solution rises above the elevation of the low level switch and will therefore remain in close proximity to the low level switch. Thus the low level switch will remain actuated until the surge tank dialysis solution level and the low level float fall below the elevation of the low level switch.

The high level switch 102b is vertically adjustable such that the upper fill limit of the surge tank can be varied from just above the low level switch position to the maximum capacity of the surge tank. By providing an adjustable high level switch, the quantity of dialysis solution within the surge tank can be regulated so that it will be replaced by freshly-mixed dialysis solution within a reasonable period of time. Thus, if only a few dialysis stations are in operation, the high and low level switches would desirably be positioned relatively close together so that the metering pumps would cycle more often and thereby maintain a relatively constant temperature supply of dialysis solution within the surge tank.

Two conductivity probes 104 and 106 are provided in the surge tank outlet conduit 92 to sense the electrical conductivity of the dialysis solution which is related to the dialysate concentration in the dialysis solution. One of the probes is temperature compensated and is sensitive only to changes in dialysate concentration. The other probe is sensitive to both temperature and dialysate concentration changes. Two conductivity meters 108 and 110 are provided to indicate the changes sensed by probes 104 and 106, respectively, and are adapted to actuate alarm systems if the dialysis solution temperature or dialysate concentration rises or falls beyond acceptable limits, or if the surge tank should run dry of dialysis solution.

Mixing tank 10 is connected to the hot water inlet conduit 66 for filling mixing tank 10 with water by conduit 112 which has a quick disconnect coupler 114 compatible with the coupler 32 on transfer means 28. The wall of mixing tank 10 may be thermally insulated, if desired, to maintain the temperature of the dialysate concentrate therein. By providing transfer means 28 adapted for filling a mixing tank 10 through conduit 112 and for transferring dialysate concentrate to supply tank 14 through transfer means 26, and by providing couplers 114 and 30 compatible with coupler 32 (and consequently not compatible with each other) it is not possible to dilute the contents of supply tank 14 by water from conduit 112 or unmixed water from mixing tank 10. Transfer means 28 can be coupled to either conduit 112 or to transfer means 26 at any one time but not to both at the same time. Thus, when dialysate concentrate is being transferred to supply tank 14, water from a conduit 112 cannot be transferred to mixing tank 10 to dilute the concentrate passing into supply tank 14. Mixing tank 10 is also provided with a float-type switch 115 which is actuated when a predetermined quantity of water is transferred therein from conduit 112. Conduit 112 is provided with a control valve means 5 which cuts off water transfer through conduit 112 to mixing tank 10 when level switch 115 is actuated.

A cold water rinse conduit 116 connects cold water inlet conduit 60 to conduit 38 downstream of metering pump 72. Waterflow through conduit 116 is controlled by control valve means 6 and by manually-operable throttle valve 118.

A hot water booster heating means 120 is connected to hot water inlet conduit 66 by conduit 122 and a sterilizing water conduit 124 is connected to booster heating means 120 and to conduit 38 downstream of metering pump 72. Sterilizing water flow through conduit 124 is controlled by control valve means 7 and by manually-operable throttle valve 126. Suitable temperature and pressure indicating means 128 and safety relief valve 130 are provided in an overflow conduit 132 which connects booster heating means 120 to a drain conduit 134. Drain conduit 134 also connects to a booster heating means drain 136 through manually operable shut-off valve 138. If desired, a conduit 142 may be connected to conduit 124 upstream of control valve means 7 to supply sterilizing water to individual bedside stations through a manifold of shut-off valves 144 which control flow through bedside sterilizer conduits 146.

As shown in FIG. 7, a preferred bedside station 200 comprises a reservoir tank 202 with a dialysis solution inlet connected to supply conduit 94, a vent and overflow conduit 204, and a dialyzer supply conduit 206. Dialyzer supply conduit 206 connects to the inlet of a dialyzer 208 through a quick disconnect coupler 210. A waste conduit 212 connects the outlet of dialyzer 208 to a positive displacement pumping means 214, a manually-operable shut-off valve 216 and a flow metering means 218. A manometer pressure sensing means 220 is connected to waste conduit 212 and is adapted to stop dialysis if a negative pressure greater than about 150 mm./Hg is sensed.

Reservoir tank 202 is provided with a heating means 222 that is manually adjustable to temper the dialysis solution within reservoir tank 202 for patient comfort, e.g., to 98° F., and to hold temperature settings within a reasonable range, for example ±2° F. Temperature sensor 224 and a high temperature switch 226 are set to stop dialysis if the dialysis solution reaches an unacceptably high temperature on the order of 106° F. The reservoir tank 202 is also provided with a dialysis solution valve control means 228 comprising a float-controlled inlet valve 230 which prevents overfilling, and a dry float switch 232 which stops dialysis if the quantity of dialysis solution in reservoir tank 202 falls below a predetermined minimum level.

Dialysis solution supply conduit 206 is provided with a manually adjustable negative pressure valve 234 to control pressure of the dialysis solution being drawn through the dialyzer 208 by pumping means 214. If desired, a solenoid-operated control valve means 236 may also be provided in conduit 206 to control dialysis solution flow to the dialyzer 208.

Waste conduit means 212 connects to the outlet to dialyzer 208 through a quick disconnect coupler 238. A sterilizing connector 240 is provided and adapted to receive couplers 210 and 238 to bypass dialyzer 208 when the bedside station is to be sterilized. Connector 240 includes a sterilize switch means 242 which is actuated when couplers 210 and 238 are attached to connector 240 as indicated by broken lines in FIG. 7 and which shuts off control circuitry associated with manometer 220, high temperature switch 226, and alters circuitry associated with float means 228 so that high temperature sterilizing water can be drawn through the bedside station by pumping means 214 without automatically shutting down pumping means 214. If high temperature sterilizing water is inadvertently passed to the bedside station without connecting couplers 210 and 238 to bypass dialyzer 208, high temperature switch 226 would automatically shut off pumping means 214 and close solenoid-operated control valve means 236 (if provided) to stop dialysis.

The connecting tube 244 for the manometer sensing means 220 is disconnected from waste conduit 212 at a port in coupler 238 and then this port is sealed with plug means 260 (conveniently hung on a chain) so that the manometer will be disconnected when coupler 238 is attached to connector 240 for sterilizing. One leg of the manometer is so connected at coupler 238 through pressure line 244 and contains electrical contacts 246 which are electrically connected when mercury rises to cover the contacts 246 at a negative pressure greater than about 150 mm./Hg to inactivate pumping means 214 and close solenoid-operated control valve means 236 (if provided) and thereby stop dialysis. The other leg of the manometer is open to atmosphere.

FIGURES 8a and 8b illustrate alternate modifications of a section of the FIG. 1 system wherein the ionic concentration of the dialysis solution is automatically regulated at the metering means 18 and 20. The metering pumps 74 and 72 are provided with separate drive motors 302 and 307. In both FIGS. 8a and 8b, a conductivity cell 306 in the conductivity probe 106, that is sensitive only to changes in conductivity, continuously senses dialysis solution ionic concentration and transmits an appropriate signal to an electrical control 301. In FIG. 8a the electrical control 301 automatically regulates the speed of the dialysate concentrate pump motor 302 in response to the signal received from the conductivity cell. In FIG. 8b the electrical control 301 automatically regulates the speed of the water metering pump motor 307 in response to the signal received from the conductivity cell. In both figures, the pump motor that is not being automatically regulated runs at a constant speed. Thus, whenever a correction in dialysis solution ionic concentration is required, the electrical control 301 will automatically adjust the relative speeds of the metering pumps 74 and 72, and thereby the relative flow rates of dialysate concentrate and water, to the degree required to correct the dialysis solution ionic concentration. A suitable feed-back mechanism may be employed to insure accurate correction of the ionic concentration.

The system above described permits manufacturing dialysate concentrate per Table I from an acceptable water supply and from manually added dry or liquid chemicals, and producing a dialysis solution which is distributed to multiple bedside stations. The bedside stations have the ability to individually control the dialysis solution temperature of that particular bedside service, without affecting the others, with each bedside station capable of individually increasing the dialysis solution temperature for patient comfort.

Table I.—Procedure for making up dialysis concentrate (1) Weigh out chemicals to prepare concentrate; for example, for a typical 35:1 concentrate:

| Chemical | Formula weight | Final conc. meq./l. | meq./l. 35:1 conc. | G./l. 35:1 conc. |
|---|---|---|---|---|
| Sodium Chloride (NaCl) | 58.45 | 100 | 3,500 | 204.6 |
| | | 95 | 3,325 | 194.3 |
| Sodium Acetate (NaAc), Anhydrous Reagent Grade | 82.04 | 35 | 1,225 | 100.5 |
| | | 40 | 1,400 | 114.9 |
| | | 38 | 1,330 | 109.1 |
| Magnesium Chloride (MgCl₂2H₂O), Reagent Grade | 203.33 | 1.0 | 35 | 3.6 |
| Calcium Chloride, Reagent Grade | 147.03 | 2.5 | 87.5 | 6.4 |
| Dextrose, Technical of Food Grade | (¹) | | | 70 |

¹ 200 mg. percent or 2.0 g./l.

(2) Fill tank ¼ full with warm water.
(3) Add all chemicals while mixing and filling.
(4) Top off tank.
(5) Mix ½ hour after filling is completed, or as required.

The bedside stations will deliver the solution to a Kiil-type dialyzer within a controlled pressure range of from static head to about 150 mm. negative pressure across the dialyzer membrane depending upon manual setting of controls, but which, when set, will accurately hold to the setting. Bedside stations will automatically shut off the negative pressure pumping and the solution flow if the solution supply is interrupted, if the negative pressure exceeds a predetermined limit or if the solution temperature exceeds 106° F. Upon such interruption the station will display an indicating light and initiate the closing of an electrical contact which may be connected to a remote central monitoring station and/or audible alarm. After the cause of interruption is corrected a reset button can be actuated to restart the dialyzing cycle to that bedside station.

*Description of component of exemplary system*

(1) Seven electrical solenoid valves (1–7) are used in the system. Six valves (1–3, 5–7) are spring-loaded and normally closed. The seventh (valve 4) is gravity closed and normally closed.

(a) Solenoid flow valve No. 1 controls dialysate concentrate flow to the dialysate concentrate metering pump. This valve is actuated along with the valves 2 and 3 when the dialysate concentrate pump motor is in operation. The function of this particular valve is to prevent any directional flow when the pumps are not in operation.

(b) Valves 2 and 3, respectively, control flow of cold water to the mixing valve, and hot water to the mixing valve. These two valves are actuated simultaneously with valve No. 1 at any time the metering pumps are placed in operation. Bypass check valve 41 permits substantially immediate pressure equalization across metering pump 72 upon the closing of valves 2 and 3 so that operation of pump 72 after closing valves 2 and 3 will not collapse conduit 38.

(c) Valve 4 is the surge tank shut-off valve. The surge tank is equipped with a solenoid actuated shut-off valve on the out-flow of the tank. This valve is so designed that it is energized in the "open" position. A weighted neoprene plunger seals the outlet of the surge tank when the solenoid is de-energized.

(d) Valve No. 5 when energized opens to fill the mixing tank with hot water. It is actuated by positioning the auto-fill switch to the "ON" position. This valve is closed by the high level float switch in the mix tank or the auto-fill switch.

(e) Solenoid valve No. 6 controls the cold rinse cycle water to the surge tank and is controlled by the time programmer.

(f) Valve No. 7 controls the hot sterilizing water to the surge tank and is controlled by the time programmer.

(2) Mixer Motor 12. The mixer motor is mounted at an angle in the mix tank to give proper directional flow and proper mixing of the dialysate concentrate and drives a 3-bladed mixing propeller. The motor is actuated by the mixer motor switch. Actuation of the switch and operation of the motor is indicated by a pilot light.

(3) Manual Valves 64, 70, 126 and 118. Four manual control valves are used. Valves 64 and 70 are cold and hot water shut-off valves, respectively. Valve 126 is a throttling valve for hot water for the sterilizing cycle, and valve 118 is the throttling valve for cold water for the rinse cycle.

(4) Hot Water Heater 120. The booster hot water heater is continuously operated whenever main power supply is on. Temperature settings are controlled by an internal temperature control to maintain the water temperature at about 190° F.

(5) Metering Pumps 72 and 74. Three positive displacement pumps are used—two for water and one for dialysate concentrate. These pumps are driven from a motor via gear belts for positive non-slip drive. The dialysate concentrate pump is driven through a variable speed reducer transmission unit. The three pumps are utilized to proportion and mix dialysate concentrate and water and deliver the mixed solution to the surge tank.

(6) Surge Tank Level Modulating Switches 100 and 102. The surge tank is equipped with two floats that magnetically actuate snap-action microswitches to automatically cycle the dialysate concentrate metering pumps and modulate the level of dialysate in the surge tank.

(7) Monitoring Systems 104, 106, 108 and 110. Two conductivity meters are used as monitors for the dialysis solution. One meter also acts as a temperature monitor since it is not temperature-compensated. Continuous monitoring of the dialysate conductvity is sensed by probes installed in the outlet of the surge tank. The probes are a flow-through type, vertically mounted to minimize the possibility of air entrapment. The monitoring systems are only activated during the dialyze cycle functioning of the system and are connected to audible and visual alarms.

(8) Alarm Systems. Two separate alarm systems, audible and visual, are included in the conductivity meter circuit. Since there are two conductivity meters, there are two independent alarm circuits. Each circuit consists of two ringing bells and two lights. One bell and one light are located on the control panel and one bell and one light are located at the nurses' station.

(9) Manual Valves 98. Manual valves 98 are a series of valves to the bedside stations. These valves are used to shut off individual bedside stations when not in use.

(10) Automatic Fill Switch 115. A switch mounted on the control panel opens solenoid valve 5 and allows water to enter the mix tank. A second switch is an adjustable float switch 115 near the top of the mix tank which will shut off valve 5 when the mixing tank is filled to a predetermined level. The float switch is a magnetically actuated snap-action microswitch.

(11) Low Concentrate Supply Switch 90. Mounted in the supply tank is a float switch actuated when the dialysate concentrate level falls below a preset limit. The switch is a magnetically actuated snap-action microswitch. This low dialysate concentrate supply warning switch actuates a buzzer and a light on the control panel and a buzzer and light at the nurses' station. A switch mounted on the control panel, title "Low Supply" turns off the audible buzzer; however, the control panel lights will remain energized until the level in the supply tank is raised above the preset limit.

(12) Valves 41 and 43. A relief valve 41 located in a circuit parallel to the water metering pump bypasses to relieve suction on the water-metering pump inlet ports when the pump motor is turned off and solenoid valves Nos. 1, 2 and 3 close. The suction is created because it takes some time for the pumps and motor to stop turning due to inertia. Check valve 43 at the supply tank outlet prevents any flow of dialysis solution into the supply tank.

(13) Manifold Pump Unit 93. It is a pump unit which draws from surge tank static head and pressurizes the bedside station supply line at 15 to 20 p.s.i. to assure adequate dialysis solution flow to the bedside stations. The manifold pump unit runs continuously any time the metering pumps switch, sterilize cycle switch, surge drain switch or pump restart switch is actuated.

*Operation of exemplary system: flow circuit sequence*

(1) Mix Tank Automatic Fill, Flow Circuit (see FIGURES 2 and 3). The system is so designed that dialysate concentrate is supplied to many stations over a long period of time. To accomplish this a mixing tank for dialysate concentrate is an integral part of the system. This dialysate concentrate mixing can be manually accomplished at any time during the dialyze or sterilize cycle. (It is necessary however that the mixing tank be drained of any previously mixed contents before beginning another batch of dialysate concentrate.)

(a) Disconnect the mix tank-to-supply tank couplers and connect the hot water line-to-mix tank couplers. (The use of a manual operation before mixing concentrate prevents the inadvertent actuating of the automatic fill switch A allowing hot water to enter already-mixed concentrate.)

(b) Turn manual switch A to "ON" position to activate the automatic fill switch 115 and to open solenoid valve 5, allowing water from the hot water supply line to flow through the quick disconnect coupling and into the mixing tank. When the water level covers the agitator the mixer motor can be manually actuated by the switch B on the control panel. It is advantageous to allow approximately 6" of water in the tank before adding the salt component of the dialysate chemicals and starting the mixing. Add the remaining chemicals as the tank fills. The water is then allowed to rise and fill the mixing tank.

(c) When the level of the tank reaches a predetermined point, e.g. 100 gallons, a float switch automatically deactivates the circuit. At this time the panel indicator light is turned on indicating that the mixing tank is full.

(d) Turn off switch A. Normally the mixer motor may be allowed to run for an additional period, e.g. 20 minutes, to complete mixing.

(e) Turn off the mixer motor switch B. After complete mixing the quick disconnect coupling from the hot water supply to the mix tank can be disconnected and the tank again connected to the supply tank. A mechanical float valve 88 modulates to maintain the level in the supply tank by permitting flow from the mixing tank.

(2) Cleaning Cycle "Rinse" (see FIGURES 2 and 4). The cleaning cycle is accomplished in two major phases—"Rinse" (cold water) and "Sterilize" (hot water). In a typical installation the rinse cycle takes approximately 15 minutes and the sterilize cycle, one hour and 30 minutes. The cycles are controlled by a timer with cams and either of these cycles, or both, may be adjusted for time length by repositioning the cams. At the end of the cleaning cycle the timer automatically resets itself to the start position. It is desirable to drain the surge tank of dialysis solution before beginning the rinse cycle. Removing dialysis solution from the surge tank allows the cold water to be circulated into the system more readily. This increases the efficiency of the rinse cycle.

(a) Positioning the toggle switch C marked "Sterilize Cycle" momentarily to the "ON" position lights the sterilize cycle indicator light, begins the rinse cycle, and starts the manifold pump.

(b) Solenoid valve 6 is opened in the cold water line allowing water to flow through the rinse water flow control valve 118, through solenoid valve 6 and into the surge tank.

(c) It is necessary to open all manifold valves 98 to the bedside stations which are to be sterilized. All bedside station lines can be rinsed and sterilized simultaneously.

(d) After a short period of time the surge tank will fill completely with cold water. At this time water will run out of the overflow line. The inlet of this overflow line is located at the top of the surge tank and the line runs to drain. It is then necessary to adjust the rinse water flow control valve 118 so that only a small amount of water is running to drain. This continuous flow of cold water insures that the surge tank is completely filled with rinse water.

(e) At the end of 15 minutes solenoid valve 6 will be de-energized by the timer and the rinse cycle will be terminated.

(3) Cleaning Cycle "Sterilize" (see FIGURES 2 and 5). As the timer continues to operate a short time lag will occur between the termination of the rinse cycle and the start of the sterilize cycle.

(a) At the start of the sterilize cycle, solenoid valve 7 is opened. Hot supply water comes from the system into the booster heater and through solenoid valve 7 and sterilizing water flow control valve 126. The booster heater will maintain a temperature of approximately 190° F.

(b) Flow from the incoming hot water line will continue to the surge tank. Incoming hot water will dilute the cold water and raise the temperature in the surge tank.

(c) Since the manifold valves to the bedside station are open, sterilized water will flow to the bedside stations.

(d) It is necessary at this time to observe the overflow drain line from the surge tank. Since incoming water from the hot water system is not flowing at the same rate as cold water, the sterilizing water flow control valve 126 must be adjusted so that only a small amount of water is flowing from the overflow line. This insures that the surge tank remains full during the sterilize cycle.

(e) The sterilizing cycle will continue for the length of time set on the timer. At the conclusion of the time, solenoid valve 7 shuts off, and the sterilize cycle light is de-energized. The timer will continue through its cycle to complete the period that is remaining, and will return to the start position. The manifold pump motor 93 will then shut off.

(f) It should be noted that the heater supply line is equipped with an automatic pressure relief valve to protect the system.

(4) Dialyze Flow Circuit (see FIGURES 2 and 6).

(a) Panel Condition: metering pumps switch D on, metering pump indicator light on. Simultaneously, the metering pump motor stars, solenoid valves 1, 2 and 3 open, and the manifold pump starts. Cold supply water enters through manual cut-off valve 64, flows through pressure reducing valve 62 which reduces incoming pressure, and flows through solenoid valve 2 to mixing valve 16. Hot water enters the system through manual shut-off valve 70, flows through pressure reducing valve 68 which reduces incoming pressure, and flows through solenoid valve 3 to mixing valve 16.

(b) The manually adjustable mixing valve 16 is adjusted for a predetermined mixed water temperature. From there flow travels through a pressure reducing valve which decreases pressure to about zero p.s.i. Pre-mixed dialysate concentrate is supplied through solenoid valve No. 1 and to the dialysate concentrate pump. The output of the dialysate concentrate pump is controlled by an adjustable proportioning handwheel.

(c) The mixed water and the dialysate concentrate blend together and mix on the way to the surge tank. Mixing is accomplished by a means of a helical diffuser inside of the piping.

(d) The surge tank has a 40 gallon capacity and is equipped with high level and low level switches. The differential between the two switches is 20 gallons. Metering means 18 and 20 operate intermittently to maintain the dialysate solution level in the surge tank between the two switches. By this overflow arrangement there is no overflow loss of dialysis solution through drain conduit 34. The surge tank level switches are electrically interconnected with the metering means (1) such that the metering means will continue to operate until both switches are actuated signifying a full surge tank, at which point operation of the metering means is terminated, and (2) such that operation of the metering means will not commence until both switches are deactuated, signifying a surge tank dialysis solution level slightly below the elevation of the low level switch.

(e) Dialysis solution leaves the surge tank, passing through the surge tank shut-off valve. The function of the surge tank shutoff valve is to cut off dialysate flow to the patients in the event there is an alarm condition. This valve is activated by the temperature or conductivity alarm systems. Flow then passes through the conductivity probe chambers. The first conductivity probe is temperature-compensated. The second conductivity probe is not. From the second probe chamber dialysate flows to the valve manifold. The dialysate cycle can continue indefinitely as required.

*Alarm and monitor systems*

(1) Conductivity Monitor. In the dialyze cycle the metering pump switch is on, the surge tank floats are cyling the metering pumps automatically as required to maintain dialysis solution in the surge tank, and the surge tank shut-off valve is opened allowing flow to bedside stations. In the event dialysate conductivity rises or lowers to the alarm point, or the dialysate temperature rises or lowers to the alarm point, visual and audible alarms are sounded. The alarm setting has been previously determined and the cams set in accordance with the desired concentration of the dialysate being used.

(a) Alarm sounds.

Simultaneously the following items occur:

(1) Metering pumps shut off and solenoid valves 1, 2 and 3 de-energized.

(2) Conductivity alarm(s) turn on (bell and lights at machine and nurses' station) and stay on.

(3) Surge tank valve shuts off flow of dialysis solution from surge tank to bedside stations. Indicator light on control panel shows valve is closed (light goes out).

(4) The manifold pump shuts off.

(5) Conductivity meter and probes stay energized; and (b) Alerted Operator Must Take the Following Action:

(1) Immediately shut off all patient manifold valves 98.

(2) Visually check conductivity meter readings, dialysis solution temperature gauge, and oscillograph chart (if used) to determine if the meter readings are high or low and the extent of the variance.

(3) Open the manifold drain valve 94 and depress the surge tank drain which opens the surge tank valve to drain the surge tank.

(4) Make correction in dialysate conductivity or temperature as required. Possibly an adjustment of the variable speed proportioning dial or of temperature of the mixing valve is necessary.

(5) Close the manifold drain valve 96 to approximately ⅓ open position.

(6) Activate the manual pump restart switch E by holding it in the down position which will (a) start metering pumps and open solenoid valves 1, 2 and 3; (b) open surge tank shut-off valve; (c) start manifold pump.

When dialysis solution reaches the probes the conductivity alarm will cease, and the surge tank shut-off valve will remain open and the float switch will automatically cycle the metering pumps again.

(7) Shut off the manifold drain valve 94 and open all patient manifold valves.

The system will now function automatically again.

What is claimed is:

1. A dialysis system comprising, dialysis stations, means for supplying dialysate concentrate, means for supplying controlled-temperature diluent, reservoir means for storing a dialysis solution, mixing means communicating with said reservoir means for intermittently mixing said dialysate concentrate with said controlled-temperature diluent in predetermined proportions to provide said dialysis solution and to maintain a dialysis solution volume in said reservoir means within predetermined limits, and means for selectively passing dialysis solution from said reservoir means to said dialysis stations.

2. A dialysis system according to claim 1 in which said dialysate concentrate supply means comprises dialysate concentrate mixing means for mixing water with dialysate chemicals to form a dialysate concentrate solution, and dialysate concentrate storing means for storing a supply of said solution.

3. A dialysis system according to claim 2 and having quick disconnect means for alternatively detachably coupling the dialysate concentrate mixing means to the dialysate concentrate storing means or to a water supply, said quick disconnected means being constructed to preclude connection of said water supply to said dialysate concentrate storing means.

4. A dialysis system according to claim 2 including first control valve means for controlling dialysate concentrate flow from said dialysate concentrate supply means to said first mentioned mixing means, second control valve means for controlling diluent flow from said controlled-temperature diluent supply means to said first mentioned mixing means, and third control valve means for controlling dialysis solution flow from said reservoir means to said dialysis stations, said three control valve means being normally closed, and means for opening said three control valve means when said first mentioned mixing means is operated.

5. A dialysis system according to claim 1 including means for sterilizing components of said dialysis system which are contacted by dialysis solution comprising: a first control valve means for controlling cold rinse water flow to said components; booster heating means for heating water to a sterilizing temperature; and a second control valve means for controlling sterilizing water flow from said booster heating means to said components, said first and second control valve means being closed when said mixing means is operated.

6. A dialysis system according to claim 1 wherein said means for mixing dialysate concentrate and controlled-temperature diluent comprises:

a diluent metering pump means having an inlet communicating with the controlled-temperature diluent supply means;

dialysate concentrate metering pump means having an inlet communicating with said dialysate concentrate supply means;

motor means for simultaneously driving said diluent metering pump means and said dialysate concentrate metering pump means;

variable speed transmission means interconnecting said motor means and said dialysate concentrate metering means; and diffusing means communicating with the outlets to said diluent metering pump means and said dialysate concentrate metering pump means and with said reservoir means.

7. A dialysis system according to claim 1 including sensing means for sensing the electrical conductivity and temperature of the dialysis solution flowing from said reservoir means to said dialysis stations, and control valve means operatively associated with said sensing means for shutting off flow of the dialysis solution to said dialysis stations whenever at least one of the electrical conductivity and the temperature of the dialysis solution is sensed to be outside of predetermined ranges.

8. A dialysis system according to claim 1 including low level and high level switch means operatively associated with said reservoir means for automatically activating and inactivating, respectively, said mixing means to control the dialysis solution volume in said reservoir within said predetermined limits.

9. A dialysis system according to claim 8 in which said switch means is adjustable for varying the spread of said limits in accordance with the number of dialysis stations in use.

10. A dialysis system according to claim 1 in which said means for supplying controlled-temperature diluent has a cold water inlet and a hot water inlet and has a controlled-temperature outlet, and said system includes control valve means for controlling dialysate concentrate flow from said dialysate concentrate supply means to said mixing means, second control valve means for controlling diluent flow to said cold water inlet, third control valve means for controlling hot water flow to said hot water inlet, fourth control valve means for controlling dialysis solution flow from said reservoir means to said dialysis stations, fifth control valve means for controlling cold rinse water flow to the components of said system which are contacted by dialysis solution, booster heating means for heating water to a sterilizing temperature, and sixth control valve means for controlling sterilizing water flow from said booster heating means to said components.

11. A dialysis system according to claim 10 wherein all of said control valve means are closed when inactive and open when active, and a control circuit whereby activating said fifth control valve means inactivates the first, second, third and sixth control valve means and said mixing means; activating said sixth control valve means inactivates the first, second, third and fifth control valve means; and activating said mixing means inactivates the fifth and sixth control valve means and activates the first, second, third and fourth control valve means.

12. A dialysis system according to claim 2 including a float-type inlet control valve means for said dialysate concentrate storing means for controlling transfer of dialysate concentrate from said dialysate concentrate mixing means to said storing means.

13. A dialysis system according to claim 4 including a normally closed fourth control valve means for controlling water supply flow to said dialysate concentrate mixing means, and a control circuit including float-type switch means in said dialysate concentrate mixing means for opening said fourth control valve means to fill said dialysate concentrate mixing means until the water level thereof reaches a predetermined level whereupon said fourth control valve means returns to its normally closed position.

14. A dialysis system according to claim 1 including pumping means for supplying pressurized dialysis solution to said dialysis stations from the reservoir means.

15. A dialysis system according to claim 1 including control means for controlling the dialysate concentrate and controlled-temperature diluent mixing means in response to the ionic concentration of the dialysis solution delivered to said dialysis stations.

16. A dialysis system according to claim 15 wherein the dialysate concentrate and controlled-temperature diluent mixing means includes a motor-driven diluent-metering pump and a motor-driven dialysate concentrate metering pump; and wherein the control means regulates the relative speeds of such pumps and thereby the relative flow rates of dialysate concentrate and water.

17. A dialysate system according to claim 1 including at least one dialysis station which comprises:
   a dialyzer having an inlet and outlet for dialysate;
   a reservoir tank having an inlet communicable with said dialysis solution reservoir means and having an outlet;
   dialysis solution pumping means having an inlet and an outlet; first quick disconnect means for detachably coupling said reservoir tank outlet to said dialyzer inlet;
   second quick disconnect means for detachably coupling the inlet to said dialysis solution pumping means to said dialyzer outlet;
   means for sensing the pressure of dialysis solution upstream of the dialysis solution pumping means inlet and for inactivating said dialysis solution pumping means when the sensed pressure falls below a predetermined range;
   means for tempering dialysis solution within said reservoir tank with a predetermined temperature range;
   means for sensing the temperature of dialysis solution within said reservoir tank and for inactivating said dialysis solution pumping means when the sensed temperature exceeds a predetermined range;
   and sterilizing connector means including means to detachably couple said first and second quick disconnect means to by-pass the dialyzer and further including means to inactivate the pressure and temperature sensing means controls.

18. A dialysis system according to claim 8 wherein said high and low level switch means each include a ferrous float and a magnetically actuated microswitch, and a float rod mounted within said reservoir means, the ferrous floats slideably engaging along said float rod.

19. A process for supplying dialysis solution to dialyzers at a plurality of dialysis stations, which comprises intermittently mixing a dialysate concentrate with a controlled-temperature diluent to form a dialysis solution, storing the dialysis solution in a first storage zone, supplying dialysis solution from said first storage zone to second storage zones at the dialyzer stations, and supplying dialysis solution from the said second storage zones to the dialyzers.

20. A process according to claim 19 wherein the intermittent mixing of dialysis solution is controlled in accordance with the dialysis solution level within said first storage zone such that dialysis solution volume in said first storage zone is maintained within predetermined limits.

21. A process according to claim 19 in which said first storage zone is thermally insulated, and said dialysis solution is tempered in said second storage zones.

22. A process for supplying dialysis solution to dialyzers at a plurality of dialyzer stations, which comprises supplying a controlled-temperature dialysis solution to a thermally-insulated first storage zone, supplying dialysis solution from said first storage zone to second storage zones at the dialyzer stations, tempering the dialysis solution in said second storage zones, and supplying the tempered dialysis solution to respective of the dialyzers.

23. A process for supplying dialysis solution to dialyzers at a plurality of dialyzer stations, which comprises intermittently supplying dialysis soluton to a first storage zone, storing the dialysis solution in the first storage zone, supplying dialysis solution from said first storage zone to second storage zones at the dialyzer stations, and supplying dialysis solution from the second storage zones to the dialyzers.

References Cited
UNITED STATES PATENTS

| | | | |
|---|---|---|---|
| 759,374 | 5/1904 | Isaacs et al. | 137—13 |
| 2,168,306 | 8/1939 | Schutte | 137—13 |
| 2,559,090 | 7/1951 | Potter | 137—93 |
| 2,564,306 | 8/1951 | Isreeli et al. | 137—99 |
| 2,632,144 | 3/1953 | Borell et al. | 137—90 X |
| 2,870,776 | 1/1959 | Marsh | 137—99 |
| 2,969,150 | 1/1961 | Broman | 210—321 |
| 3,212,642 | 10/1965 | Kylstra | 210—321 |

REUBEN FRIEDMAN, *Primary Examiner.*

D. RIESS, *Assistant Examiner.*